United States Patent
Robustelli et al.

(10) Patent No.: US 9,838,530 B1
(45) Date of Patent: Dec. 5, 2017

(54) DEVICE AND METHOD OF SOUND INTERFERENCE AVOIDANCE

(71) Applicant: SYMBOL TECHNOLOGIES, LLC, Lincolnshire, IL (US)

(72) Inventors: Michael Robustelli, Smithtown, NY (US); Dror Moshe, Ganei Tikva (IL)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/374,095

(22) Filed: Dec. 9, 2016

(51) Int. Cl.
*H04B 1/38* (2015.01)
*H04M 3/02* (2006.01)
*G06F 3/16* (2006.01)
*H04W 88/02* (2009.01)

(52) U.S. Cl.
CPC .............. *H04M 3/02* (2013.01); *G06F 3/165* (2013.01); *H04W 88/02* (2013.01)

(58) Field of Classification Search
CPC .......... H04M 3/02; G06F 3/165; H04W 88/02
See application file for complete search history.

(56) References Cited

U.S. PATENT DOCUMENTS

| | | | |
|---|---|---|---|
| 2014/0280729 A1* | 9/2014 | Thomas | H04W 4/003 709/217 |
| 2016/0094960 A1 | 3/2016 | Wong | |
| 2016/0292993 A1* | 10/2016 | Kozloski | G08B 3/10 |

* cited by examiner

*Primary Examiner* — Xin Jia

(57) ABSTRACT

A device and method of sound interference avoidance is provided. The device includes: a speaker; an electronic component; a memory storing data defining a plurality of different sounds associated with a given action at the electronic component; a communication interface; and, a controller configured to: communicate, using the communication interface, with one or more of a server and other devices to determine sounds currently in use by the other devices; select one sound, of the plurality of different sounds, to indicate the given action based on the sounds in use by the other devices; and, when the given action is detected at the electronic component, control the speaker to play the one sound that has been selected.

18 Claims, 15 Drawing Sheets

DEVICE AND METHOD OF SOUND INTERFERENCE AVOIDANCE

BACKGROUND

Workers in warehousing, transportation and logistics often used scanner equipped mobile devices to scan barcodes, and the like, and a confirmation of a scan may be provided using a sound, such as a beep. When two or more workers in the warehouse are working within audible distances, confusion may occur when the devices all provide the same confirmation sounds. For example, one worker could be unsuccessfully scanning a barcode and hear the confirmation sound from an adjacent device which could cause the worker to erroneously believe the present scan was successful.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
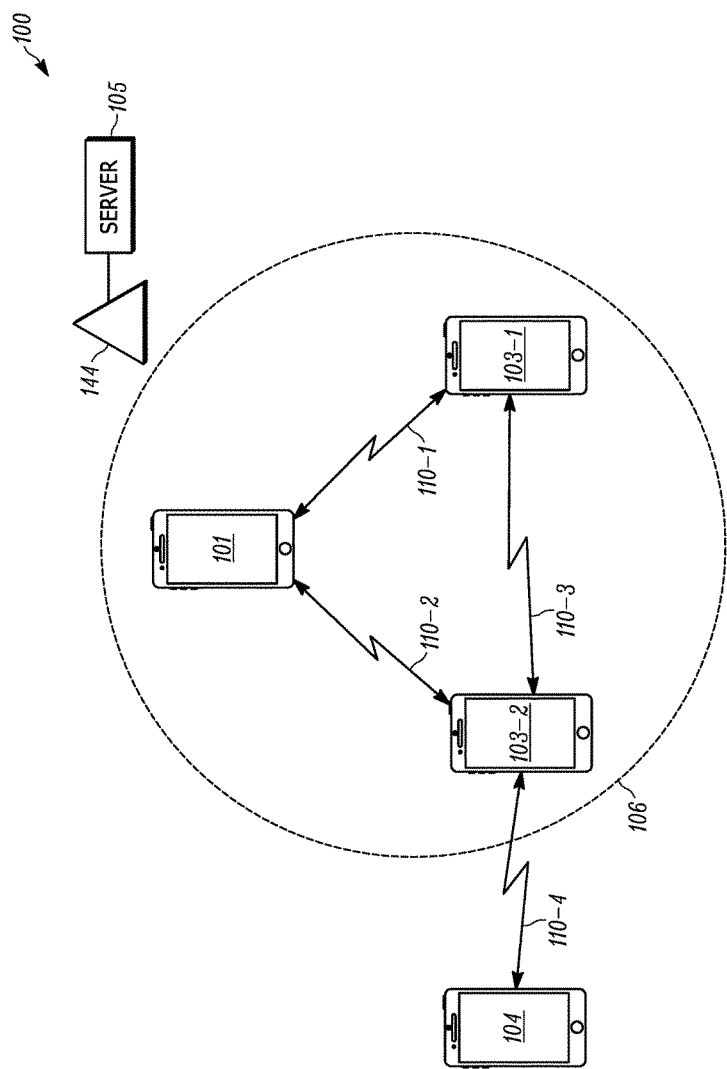
FIG. 1 depicts a system that includes at least one device with sound interference avoidance functionality, with devices of the system communicating using a P2P network, according to non-limiting implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

The present specification provides a device and/or a mobile device which automatically avoids sound collisions and/or sound interference with other devices and/or mobile devices that may be within an audible distance of the mobile device. The device communicates with one or more of a server and the other devices to determine sound in use by the other devices to indicate a given action and/or another action, and responsively selects a sound to indicate the given action based on the sounds in use by the other mobile devices. For example, the device may select a sound that is different from the sounds in use by the other devices, and/or select a sound that is least used by the other devices and/or select a sound based on locations of the other devices. Furthermore, the sound selected may expire (e.g. stop being used as an indicator of the given action) after a given time period. Furthermore, the selection of the sound may occur independent of whether the other devices are within an audible distance of the mobile device, such that if the devices is moved to within the audible distance, sound interference is less likely to occur.

An aspect of the specification provides a device comprising: a speaker; an electronic component; a memory storing data defining a plurality of different sounds associated with a given action at the electronic component; a communication interface; and, a controller configured to: communicate, using the communication interface, with one or more of a server and other devices to determine sounds currently in use by the other devices; select one sound, of the plurality of different sounds, to indicate the given action based on the sounds in use by the other devices; and, when the given action is detected at the electronic component, control the speaker to play the one sound that has been selected.

In some implementations, the controller is further configured to: select the one sound, of the plurality of different sounds, different from the sounds in use by the other devices.

In some implementations, the controller is further configured to: when all of the plurality of different sounds stored in the memory are in use by the other devices, select the one sound, of the plurality of different sounds that is least currently used by the other devices.

In some implementations, the controller is further configured to: when all of the plurality of different sounds stored in the memory are in use by the other devices, select the one sound, of the plurality of different sounds based on one or more of locations of the other devices.

In some implementations, the controller is further configured to one or more of: control the speaker to play the one sound that has been selected only for a given time period after the one sound being selected; unselect the one sound after an in-use period is over; and unselect the one sound when a given event is detected.

In some implementations, the electronic component comprises a data capture component, and the given action comprises a successful data capture.

In some implementations, the electronic component comprises a data capture component, and the given action comprises an unsuccessful data capture.

In some implementations, the electronic component comprises one or more of a radio component, a push-to-talk component, and a telephonic component, the given action comprises a communication action.

In some implementations, the electronic component comprises a messaging component, and the given action comprises a messaging action.

In some implementations, the device further comprises a mobile device. In some implementations, one or more of the other devices comprises a mobile device.

Another aspect of the specification provides a method comprising: at a device including: a speaker; an electronic component; a memory storing data defining a plurality of different sounds associated with a given action at the electronic component; a communication interface; and, a controller, communicating, using the communication interface, with one or more of a server and other devices to determine sounds currently in use by the other devices; selecting, using the controller, one sound, of the plurality of different sounds, to indicate the given action based on the sounds in use by the other devices; and, when the given action is detected at the electronic component, controlling, using the controller, the speaker to play the one sound that has been selected.

In some implementations, the method further comprises: selecting the one sound, of the plurality of different sounds, different from the sounds in use by the other devices.

In some implementations, the method further comprises: when all of the plurality of different sounds stored in the memory are in use by the other devices, selecting the one sound, of the plurality of different sounds that is least currently used by the other devices.

In some implementations, the method further comprises: when all of the plurality of different sounds stored in the memory are in use by the other devices, selecting the one sound, of the plurality of different sounds based on one or more of locations of the other devices.

In some implementations, the method further comprises one or more of: controlling the speaker to play the one sound that has been selected only for a given time period after the one sound being selected; unselecting the one sound after an in-use period is over; and unselecting the one sound when a given event is detected.

In some implementations, the electronic component comprises a data capture component, and the given action comprises a successful data capture.

In some implementations, the electronic component comprises a data capture component, and the given action comprises an unsuccessful data capture.

In some implementations, the electronic component comprises one or more of a radio component, a push-to-talk component, and a telephonic component, the given action comprises a communication action.

In some implementations, the electronic component comprises a messaging component, and the given action comprises a messaging action.

A further aspect of the specification provides a non-transitory computer-readable medium storing a computer program, wherein execution of the computer program is for: at a device including: a speaker; an electronic component; a memory storing data defining a plurality of different sounds associated with a given action at the electronic component; a communication interface; and, a controller, communicating, using the communication interface, with one or more of a server and other mobile devices to determine sounds currently in use by the other mobile devices; selecting, using the controller, one sound, of the plurality of different sounds, to indicate the given action based on the sounds in use by the other mobile devices; and, when the given action is detected at the electronic component, controlling, using the controller, the speaker to play the one sound that has been selected.

Attention is directed to FIG. 1 which depicts a system 100 comprising a device 101, a plurality of devices 103-1, 103-2 adjacent device 101, a device 104 remote from device 101, and an optional server 105. In some implementations, device 101 includes a mobile device, while in other implementations, device 101 includes another type of device, including, but not limited to a non-mobile device. Devices 103-1, 103-2 will be interchangeably referred to hereafter, collectively, as devices 103, and, generically, as a device 103; in some implementations, devices 103 include a mobile device, while in other implementations, device 101 include another type of device, including, but not limited to a non-mobile device. Similarly, in some implementations, device 104 includes a mobile device, while in other implementations, device 104 includes another type of device, including, but not limited to a non-mobile device.

Devices 101, 103 are understood to be adjacent to one another and, in particular, located in a given physical area 106. For example, area 106 may comprise a portion of a warehouse, and the like. Furthermore, area 106 may comprise an area that workers associated with devices 101, 103 have been assigned to work. In some implementations, area 106 may be of a size and configuration such that device 101 is within an audible distance of one or more of devices 103; in other words, a worker using device 101 may hear sounds produced by one or more of devices 103.

Similarly, device 104 may be located outside of area 106 such that a worker using device 101 may not hear sounds produced by device 104.

Furthermore, each of devices 101, 103, 104 may be in communication with one other using peer-to-peer (P2P) communications (for example using Bluetooth™, near field communications, and the like) such that devices 101, 103, 104, together, form a P2P network. For example, as depicted in FIG. 1, device 101 is in communication with each of devices 103 using a respective wireless link 110-1, 110-2; each of devices 103 are in communication with each other using a respective wireless link 110-3; and devices 103-2, 104 are in communication with each other using a respective wireless link 110-4. Wireless links 110-1, 110-2, 110-3, 110-4 will be will be interchangeably referred to hereafter, collectively, as links 110, and, generically, as a link 110.

Furthermore, links 110 may be used to communicate data between devices 101, 103, 104 even when one of devices 101, 103, 104 is not in communication with another of devices 101, 103, 104. For example, as depicted, devices 101, 104 are not in direct communication with each other (e.g. there is no link 110 therebetween); however, device 104 may communicate data to device 103-2 using link 110-4, and device 103-2 may communicate the data from device 104 to device 101. Hence, data may be distributed throughout the P2P network. Alternatively, devices 101, 103, 104 may communicate via an access point 144 (including, but not limited to a WiFi access point), which, some implementations, as depicted, is communication with server 105.

Figure 2:
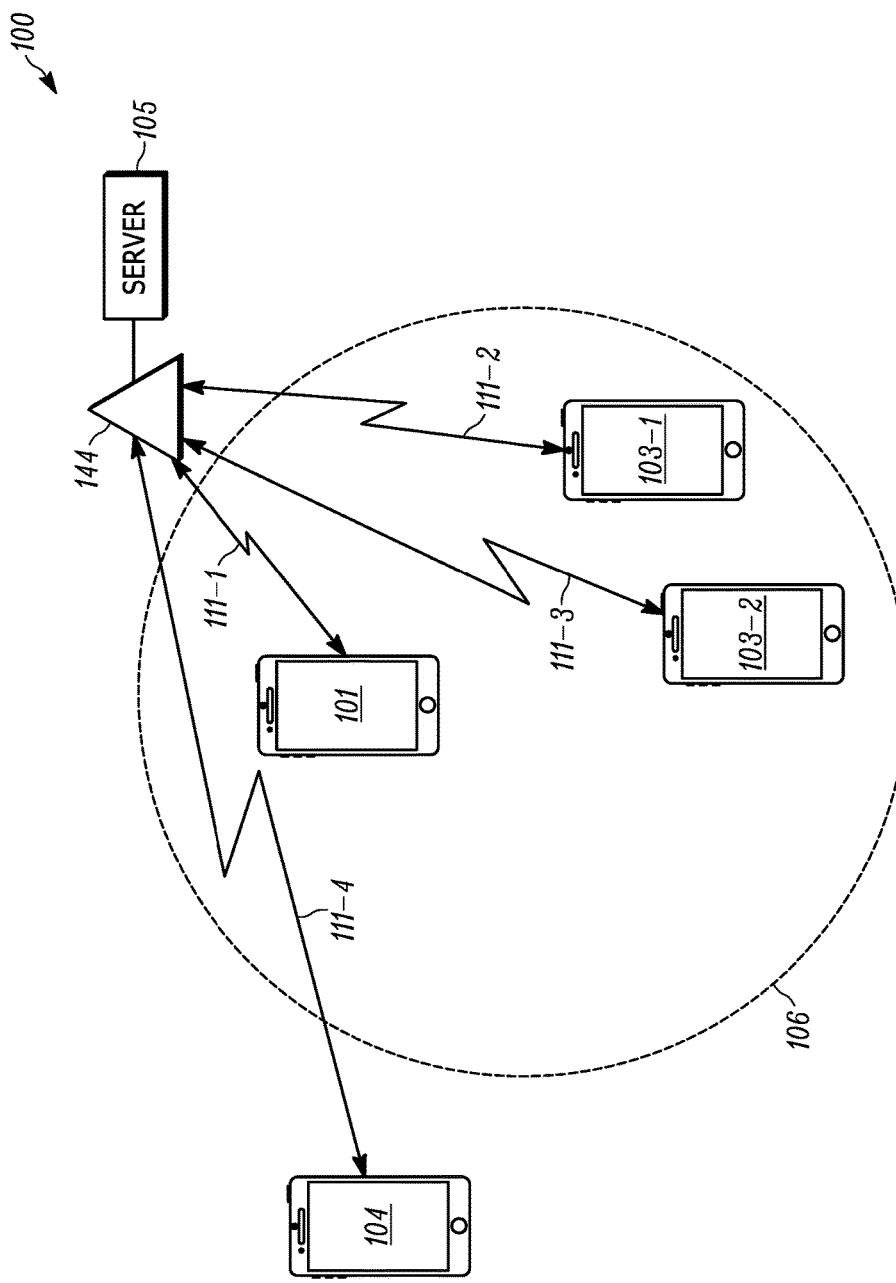
FIG. 2 depicts the system of FIG. 1 with devices of the system communicating using a server, according to non-limiting implementations.

Alternatively, with reference to FIG. 2 (which is substantially similar to FIG. 1, with like elements having like numbers), each of devices 101, 103, 104 may be in communication with server 105 using respective wireless links 111-1, 111-2, 111-3, 111-4 which will be will be interchangeably referred to hereafter, collectively, as links 111, and, generically, as a link 111. As depicted, each of links 111 is to access point 144, which is in communication with server 105. Hence, data transmitted between devices 101, 103, 104 and server 105 is conveyed therebetween using access point 144. However, in other implementations, access point 144 is absent system 100 and/or devices 101, 103, 104 and server 105 using a communication network, such as a cell phone communication network, and the like. Furthermore, server 105 may be configured to convey data between devices 101, 103, 104 using links 111; hence, devices 101, 103, 104 may be in communication using server 105.

While only two devices 103, and one device 104, are depicted in system 100, it is appreciated that system 100 may comprise any number of each of devices 103, 104, including only one of devices 103 or device 104. In other words, system 100 may comprise device 101 and only one other device.

Furthermore, each of devices 101, 103, 104 may generally comprises a mobile device which may include, but is not limited to, any suitable combination of electronic devices, communications devices, computing devices, portable electronic devices, mobile computing devices, portable computing devices, tablet computing devices, telephones, PDAs (personal digital assistants), cellphones, smartphones, e-readers, mobile camera devices and the like, each of which comprises a data capture component. Other suitable devices are within the scope of present implementations. For example, each of devices 101, 103, 104 may be enabled as a mobile communication device with telephonic functionality and/or push-to-talk (PTT) functionality that may be also enabled for data capture functionality for example using a data capture component such as a camera, a laser scanner, an imager, a barcode scanner and the like. However, each of devices 101, 103, 104 need not comprise a mobile communication device, but rather may comprise a device specifically adapted for specialized functionality. For example, each of devices 101, 103, 104 may be specifically adapted for warehouse inventory tracking and/or other data acquisition functionality using a data capture component and may further include other types of hardware for warehouse inventory tracking and/or other data acquisition functionality, which may include, but is not limited to, one or more of a radio frequency identification (RFID) reader, a Near Field Communication (NFC) reader, and/or other types of data acquisition components. In yet further implementations, one or more of devices 101, 103, 104 may be mountable in a vehicle. In yet further implementations, one or more of devices 101, 103, 104 may comprise a wearable device. In yet further implementations, one or more of devices 101, 103, 104 may comprise a portable indicator device and/or digital signage. However, other devices are within the scope of present implementations. Furthermore, in some implementations, one or more of devices 101, 103, 104 is not mobile and can include, but is not limited to a point-of-sale terminal and the like.

Figure 3:
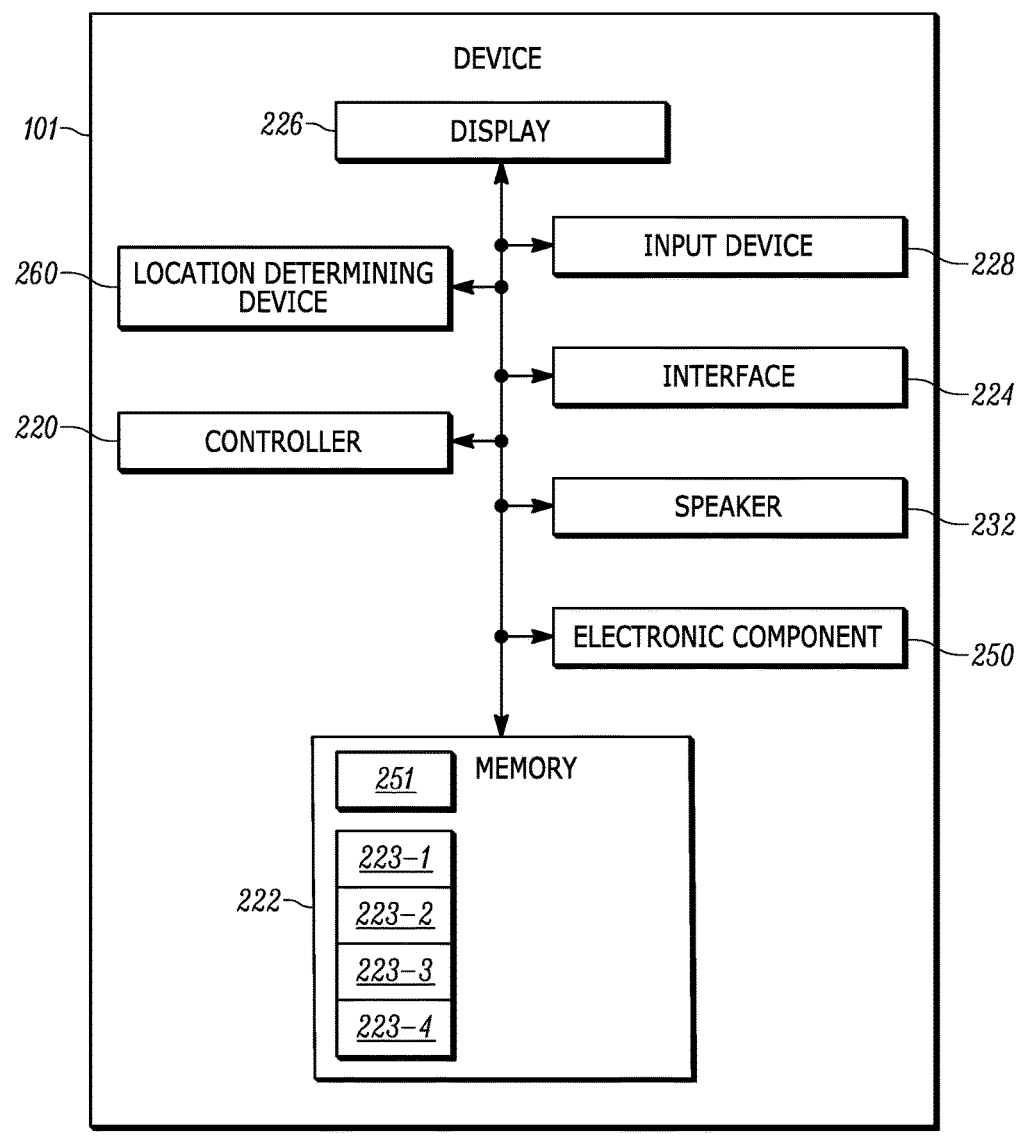
FIG. 3 depicts a schematic diagram of a device of the system of FIG. 1 with sound interference avoidance functionality, according to non-limiting implementations.

Attention is next directed to FIG. 3 which depicts a schematic diagram of device 101 comprising: a speaker 232; an electronic component 250; a memory 222 storing data 223-1, 223-2, 223-3, 223-4 (interchangeably referred to hereafter, collectively, as data 223, and, generically, as data 223 and/or a set of data 223) defining a plurality of different sounds which may be associated with a given action at electronic component 250; a communication interface 224 (interchangeably referred to hereafter as interface 224); and, a controller 220 configured to: communicate, using communication interface 224, with one or more of server 105 and other devices 103, 104 to determine sounds currently in use by other devices 103, 104; select one sound, of the plurality of different sounds, to indicate the given action based on the sounds in use by other devices 103, 104; and, when the given action is detected at electronic component 250, control speaker 232 to play the one sound that has been selected. As depicted, device 101 further comprises a display 226, at least one input device 228 and an optional location determining device 260.

Each set of data 223 comprises respective sound data and/or a respective sound file which may be used to control speaker 232 to emit and/or play a sound defined by one of data 223-1, 223-2, 223-3, 223-4, for example when a given action occurs at electronic component 250. For example, electronic component 250 may comprise a data capture component configured to capture data (e.g. for warehousing applications, and the like) and when the data capture component successfully captures data (including, but not limited to a barcode), controller 220 may control speaker 232 to play a sound defined by one set of data 223. However, as described below, controller 220 may select one sound (e.g. defined by one set of data 223), of the plurality of different sounds, to indicate the given action based on the sounds in use by other devices 103, 104, in order to avoid and/or reduce sound interference with other device 103, 104.

While four sets of data 223 are stored at device 101, fewer than four sets of data 223 and more than four sets of data 223 may be stored at device 101.

In addition to respective sound data and/or a respective sound file, each set of data 223 may further comprise an identifier thereof, for example an alphanumeric identifier, and the like.

Each set of data 223 may comprise data that defines one or more of data that defines single frequencies, tones, timbres, harmonic chords, distortions, and the like.

In addition, each set of data 223 may be different from one another. For example, each set of data 223 may define respective sounds that are different frequencies, different tones, different timbres, different harmonic chords, different distortions and the like.

Furthermore, data 223 may be provisioned at device 101 (as well as devices 103, 104) at a factory and/or when application 251 is provisioned at device 101 and/or data 223 may be received from server 105 and/or other devices 103, 104. For example, in some implementations, server 105 may manage devices 101, 103, 104 and provision each of devices 101, 103, 104 similarly such that each of devices 101, 103, 104 stores same data 223.

With further reference to FIG. 3, controller 220 may comprise a processor and/or a plurality of processors, including but not limited to one or more central processors (CPUs) and/or one or more processing units; either way, controller 220 comprises a hardware element and/or a hardware processor. Indeed, in some implementations, controller 220 may comprise an ASIC (application-specific integrated circuit) and/or an FPGA (field-programmable gate array)

specifically configured to implement at sound interference avoidance functionality of device 101. Hence, in some implementations, device 101 is not a generic computing device, but a device specifically configured to implement specific sound interference avoidance functionality. For example, device 101 and/or controller 220 may specifically comprise a computer executable engine configured to implement specific sound interference avoidance.

Memory 222 may comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 222 and used by controller 220 which makes appropriate utilization of volatile storage during the execution of such programming instructions. Those skilled in the art recognize that memory 222 is an example of computer readable media that may store programming instructions executable on controller 220. Furthermore, memory 222 is also an example of a memory unit and/or memory module and/or a non-volatile memory.

As depicted, memory 222 further stores application 251 that, when executed by controller 220, enables controller 220 to implement sound interference avoidance at device 101. In other words, as described in detail below, application 251 may be executed by controller 220 to: communicate, using communication interface 224, with one or more of server 105 and other devices 103, 104 to determine sounds currently in use by other devices 103, 104; select one sound, of the plurality of different sounds, to indicate the given action based on the sounds in use by other devices 103, 104; and, when the given action is detected at electronic component 250, control speaker 232 to play the one sound that has been selected.

Application 251 may hence comprise an application which for sound avoidance functionality, for example in warehousing applications. As such, application 251 may comprise a warehousing application and/or application 251 may be a module of a warehousing application.

As depicted, controller 220 also connects to interface 224, which may be implemented as one or more radios and/or connectors and/or network adaptors, configured to communicate wired and/or wirelessly with network architecture that is used to implement one or more communication links 110, 111 between other devices 103, 104, server 105 and/or a network, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, Bluetooth™, WiFi links, WiMax links, packet based links, the Internet, analog networks, the PSTN (public switched telephone network), access points, and the like, and/or a combination.

Display 226 comprises any suitable one of, or combination of, flat panel displays (e.g. LCD (liquid crystal display), plasma displays, OLED (organic light emitting diode) displays), CRTs (cathode ray tubes) and the like, as well as one or more optional touch screens (including capacitive touchscreens and/or resistive touchscreens.

At least one input device 228 comprises any suitable device configured to receive input data, including, but not limited to, any suitable combination of a keypad, a pointing device, a mouse, a track wheel, a trackball, a touchpad and the like. Other suitable input devices are within the scope of present implementations. Indeed, a least one input device 228 may comprise a touch screen of display 226 which may generally be used as an input device to control other functionality at device 101, for example, using graphic user interfaces, digital buttons, pull down menus, and the like.

Speaker 232 is generally configured to play any of data 223, and the like, to provide an indication of a given action at electronic component 250 as described in more detail below.

Electronic component 250 may comprise a data capture component, as described above, configured to capture data, for example barcodes, and the like, in warehousing environments. As such, the given action may comprise a successful data capture. Alternatively, the given action may comprise an unsuccessful data capture.

Alternatively, electronic component 250 may comprises one or more of a radio component, a push-to-talk component, and a telephonic component; and the given action may comprise a communication action, including, but not limited to, an incoming telephonic call and/or an incoming telephonic message.

Alternatively, electronic component 250 may comprise a messaging component; and the given action comprises a messaging action, including, but not limited to, an incoming message.

However, electronic component 250 may comprise any suitable combination of electronic components at which actions may occur and for which indicators thereof may be provided; and furthermore, respective sounds (e.g. defined using sound data) may be used to indicate one or more respective given actions for each of the electronic components. In other words, while present implementations are described with respect to sound interference avoidance for one given action, sound interference avoidance, as described herein, may occur for a plurality of given actions and/or a plurality of sounds.

Optional location determining device 260 may include, but is not limited to a Global Positioning System (GPS) device, a GLONASS (Global Navigation Satellite System) device, a triangulation device, and the like. In particular, optional location determining device 260 may be used to determine a location of device 101; such a location may comprise an absolute location and/or a relative location (e.g. inside area 106 or outside area 106, as described in more detail below).

While not depicted, device 101 further comprises a power supply, including, but not limited to, a connection to a mains power supply and/or a power adaptor (e.g. an AC-to-DC (alternating current to direct current) adaptor), and alternatively a battery, a power pack and the like. In general, such a power supply powers components of device 101.

Furthermore, device 101 may be adapted for mating with one or more of a cradle, a charging cradle (e.g. that charges a battery, a power pack and the like), and a charging device, and controller 220 may be configured to determine when device 101 is mated with such cradles and/or devices.

Hence, it should be understood that in general a wide variety of configurations for device 101 are contemplated and device 101 may include other components related, for example to telephony, messaging, entertainment, and/or any other components that may be used with a mobile device.

Figure 4:
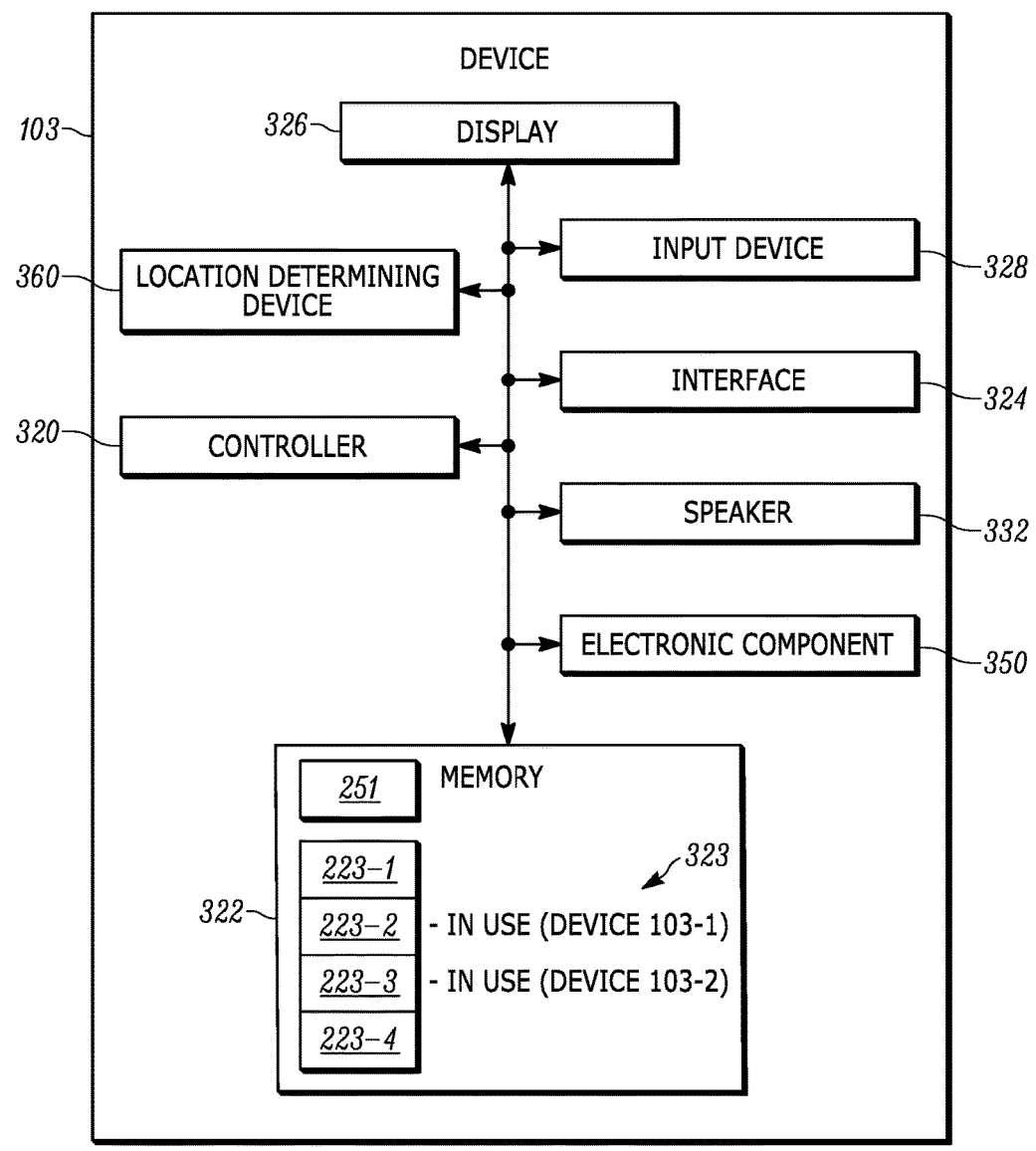
FIG. 4 depicts a schematic diagram of another device of the system of FIG. 1, according to non-limiting implementations.

Attention is next directed to FIG. 4, which depicts a schematic diagram of device 103, which is substantially similar to device 101, with like elements having like numbers, however in a "300" series, rather than a "200" series. Hence device 103 comprises: a controller 320 interconnected with a memory 322, a communication interface 324 (interchangeably referred to hereafter as interface 324), a display 326, at least one input device 328, a speaker 332, an electronic component 350 and an optional location determining device 360. Memory 322 may optionally store application 251, such that devices 103 are enabled for sound avoidance collision. Memory 322 further stores data 223 that is similar and/or the same as data 223 stored at memory 222 of device 101, however, memory 322 may store more sets of data 223 than device 101 or fewer sets of data 223 than device 101.

Furthermore, as depicted, one or more sets of data 223 are associated with an indicator 323 which indicates that a particular set of data 223 is in use at device 103. As depicted, data 223-2 is associated with an indicator 323 ("IN USE") indicating that data 223-2 is in use (e.g. at device 103-1), and data 223-2 is depicted in association with an indicator 323 ("IN USE") indicating that data 223-3 is in use (e.g. at device 103-2). When the device 103 depicted in FIG. 4 is device 103-1, only indicator 323 of data 223-2 is provided, and when the device 103 depicted in FIG. 4 is device 103-2, only the indicator 323 of data 223-3 is provided.

Furthermore, rather than a generic indicator, indicators 323 associated with either data 223-2, 223-3 may indicate a specific given action of electronic component 250 with which to use the associated data 223-2, 223-3. For example, assuming that data 223-2 is be used to control a respective speaker 332 at device 103-1 to emit a given sound when a given action occurs at a respective electronic component 350, the indicator 323 of data 223-2 may indicate the associated given action; for example, when respective electronic component 350 comprises a data capture component, a sound defined by data 223-2 may be played by a respective speaker 332 to indicate a respective successful data capture, and indicator 323 associated with data 223-2 may indicate such.

Similarly, assuming that data 223-3 is be used to control a respective speaker 332 at device 103-2 to emit a given sound when a given action occurs at a respective electronic component 350, the indicator 323 of data 223-2 may indicate the associated given action; for example, when respective electronic component 350 comprises a data capture component, a sound defined by data 223-2 may be played by a respective speaker 332 to indicate a respective successful data capture, and indicator 323 associated with data 223-2 may indicate such.

Furthermore, any type of indicator 323 indicating that a given set of data 223 is in use is within the scope of present implementations.

Figure 5:
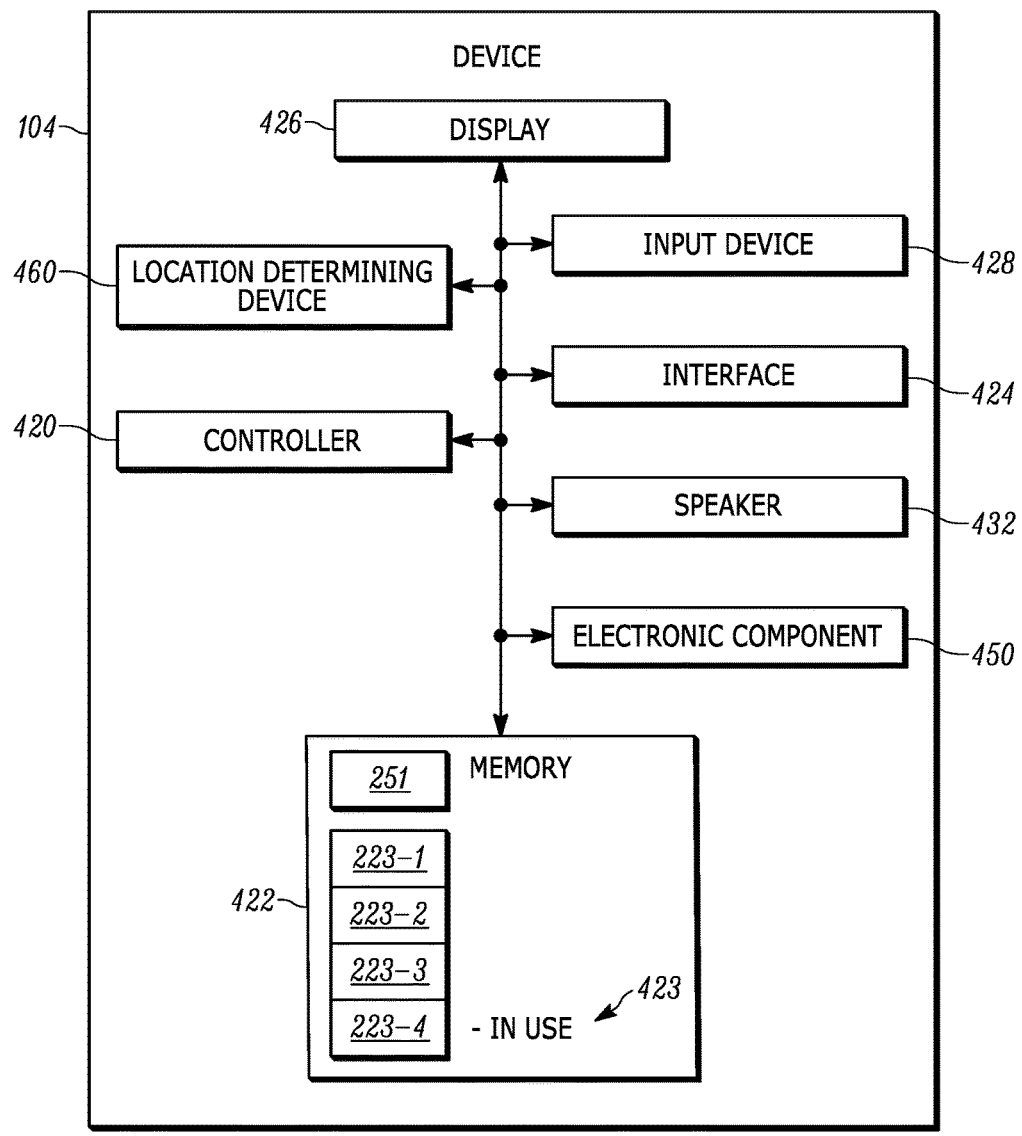
FIG. 5 depicts a schematic diagram of yet a further device of the system of FIG. 1, according to non-limiting implementations.

Attention is next directed to FIG. 5, which depicts a schematic diagram of device 104, which is substantially similar to device 101, with like elements having like numbers, however in a "400" series, rather than a "200" series. Hence device 104 comprises: a controller 420 interconnected with a memory 422, a communication interface 424 (interchangeably referred to hereafter as interface 424), a display 426, at least one input device 428, a speaker 432, an electronic component 450 and an optional location determining device 460. Memory 422 may optionally store application 251, such that device 104 is enabled for sound avoidance collision. Memory 422 further stores data 223 that is similar and/or the same as data 223 stored at memory 222 of device 101, however, memory 422 may store more sets of data 223 than device 101 or fewer sets of data 223 than device 101.

Furthermore, data 223-4 is depicted in association with an indicator 423 ("IN USE") indicating that data 223-4 is in use at device 104), similar to indicators 323 described above with respect to FIG. 4.

Hence, each of devices 103, 104 may include indicators that indicate whether a a sound associated with a respective set of data 223 is in use (or alternatively not in use), and alternatively a given action with which the sound is associated.

In addition, at each of devices 103, 104, selection of sounds for given actions of a respective electronic component 350, 450 may occur by a respective controller 320, 420 implementing application 251, and/or by server 105 assigning sounds for such given actions to one or more of device 103, 104 and/or such selection may be provisioned at a factory and/or when each device 103, 104 is deployed in system 100.

Figure 6:
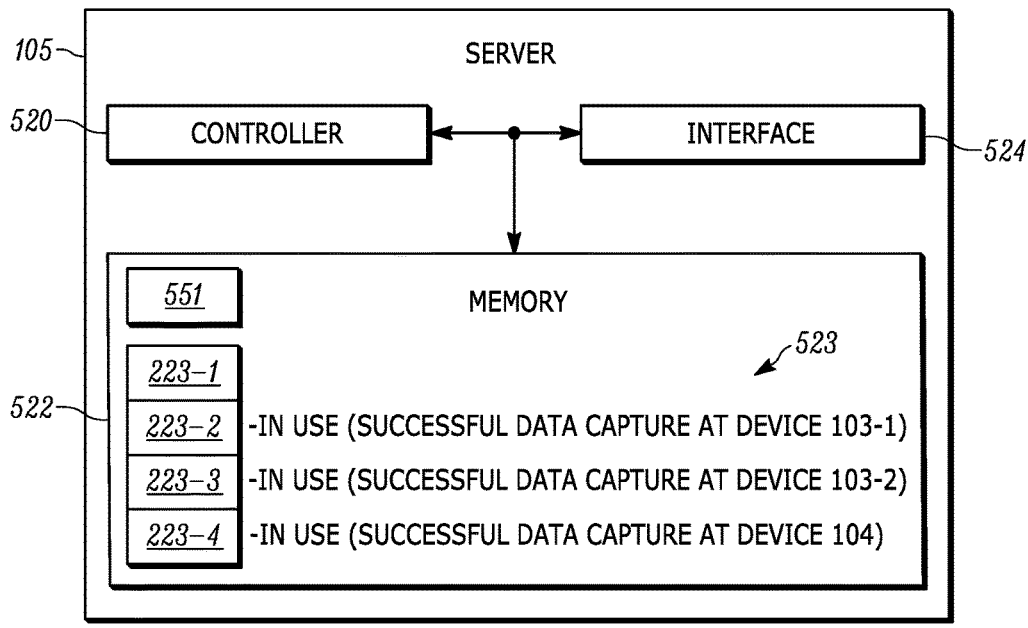
FIG. 6 depicts a schematic diagram of a server of the system of FIG. 1, according to non-limiting implementations.

Attention is next directed to FIG. 6 which depicts a schematic diagram of server 105 which comprises a controller 520 interconnected with a memory 522 and a communication interface 524 (interchangeably referred to hereafter as interface 524). Controller 520, memory 522 and interface 524 may be respectively similar to controller 220, memory 222 and interface 224 adapted, however, for server functionality, and interface 524 further adapted for communication with devices 101, 103, 104 using links 111. As depicted, memory 522 may store data 223, and server 105 may be configured to deploy data 223 to devices 101, 103, 104. As depicted, memory 522 further stores an application 551 which, when executed by controller 520, causes controller 520 to implement the functionality of server 105, at least related to sound interference avoidance.

Furthermore, each of data 223-2, 223-3, 223-4 may be associated with a respective indicator 523 similar to the indicators 323, 423 of FIG. 4 and FIG. 5, each of which may optionally include an identifier of devices 103, 104 associated with a given set of data 223 where the given set of data 223 is in use, as well as an optional identifier of a given action associated with the given set of data 223.

For example, as depicted: an indicator 523 of data 223-2 indicates that data 223-2 is in use at device 103-1 to provide a sound to indicate a successful data capture; an indicator 523 of data 223-3 indicates that data 223-3 is in use at device 103-2 to provide a sound to indicate a successful data capture; and an indicator 523 of data 223-4 indicates that data 223-4 is in use at device 104 to provide a sound to indicate a successful data capture. Such indicators 523 may be populated based on data received from devices 103, 104, and/or based on assignment of respective data 223 to devices 103, 104 by server 105. Furthermore, indicators 523 may optionally include a location of a device 103, 104. Indeed, memory 522 may optionally store locations of device 101, 103, 104 based, for example, on data received from each of devices 101, 103, 104 as determined from respective location determining devices 260, 360, 460.

Furthermore, server 105 can comprise one or more servers. In addition, server 105 can comprise one or more warehouse management servers, one or more logistics management servers, and the like.

Figure 7:
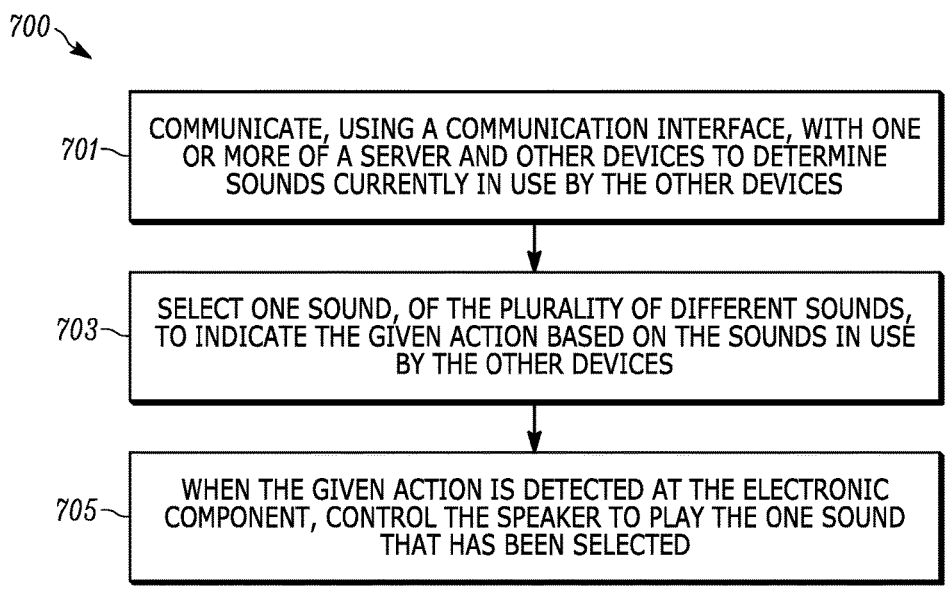
FIG. 7 depicts a flowchart of a method of sound interference avoidance, according to non-limiting implementations.

Attention is now directed to FIG. 7 which depicts a block diagram of a flowchart of a method 700 for providing sound interference avoidance functionality. In order to assist in the explanation of method 700, it will be assumed that method 700 is performed using device 101, and specifically by controller 220 at device 101, when controller 220 executes instructions stored at memory 222, for example application 251. Indeed, method 700 is one way in which device 101 may be configured. Furthermore, the following discussion of method 700 will lead to a further understanding of device 101, system 100 and its various components. However, it is to be understood that device 101, system 100, and/or method 700 may be varied, and need not work exactly as discussed herein in conjunction with each other, and that such variations are within the scope of present implementations.

Regardless, it is to be emphasized, that method 700 need not be performed in the exact sequence as shown, unless otherwise indicated; and likewise, various blocks may be performed in parallel rather than in sequence; hence the elements of method 700 are referred to herein as "blocks" rather than "steps". It is also to be understood, however, that method 700 may be implemented on variations of device 101 as well.

At block 701, controller 220 communicates, using communication interface 224, with one or more of server 105 and other devices 103, 104 to determine sounds currently in use by other devices 103, 104.

At block 703, controller 220 selects one sound, of a plurality of different sounds (e.g. as defined by data 223), to indicate a given action based on the sounds in use by other devices 103, 104.

At block 705, controller 220, when the given action is detected at electronic component 250, control speaker 232 to play the one sound that has been selected.

Method 700 will now be described with reference to FIG. 8 to FIG. 16.

Figure 8:
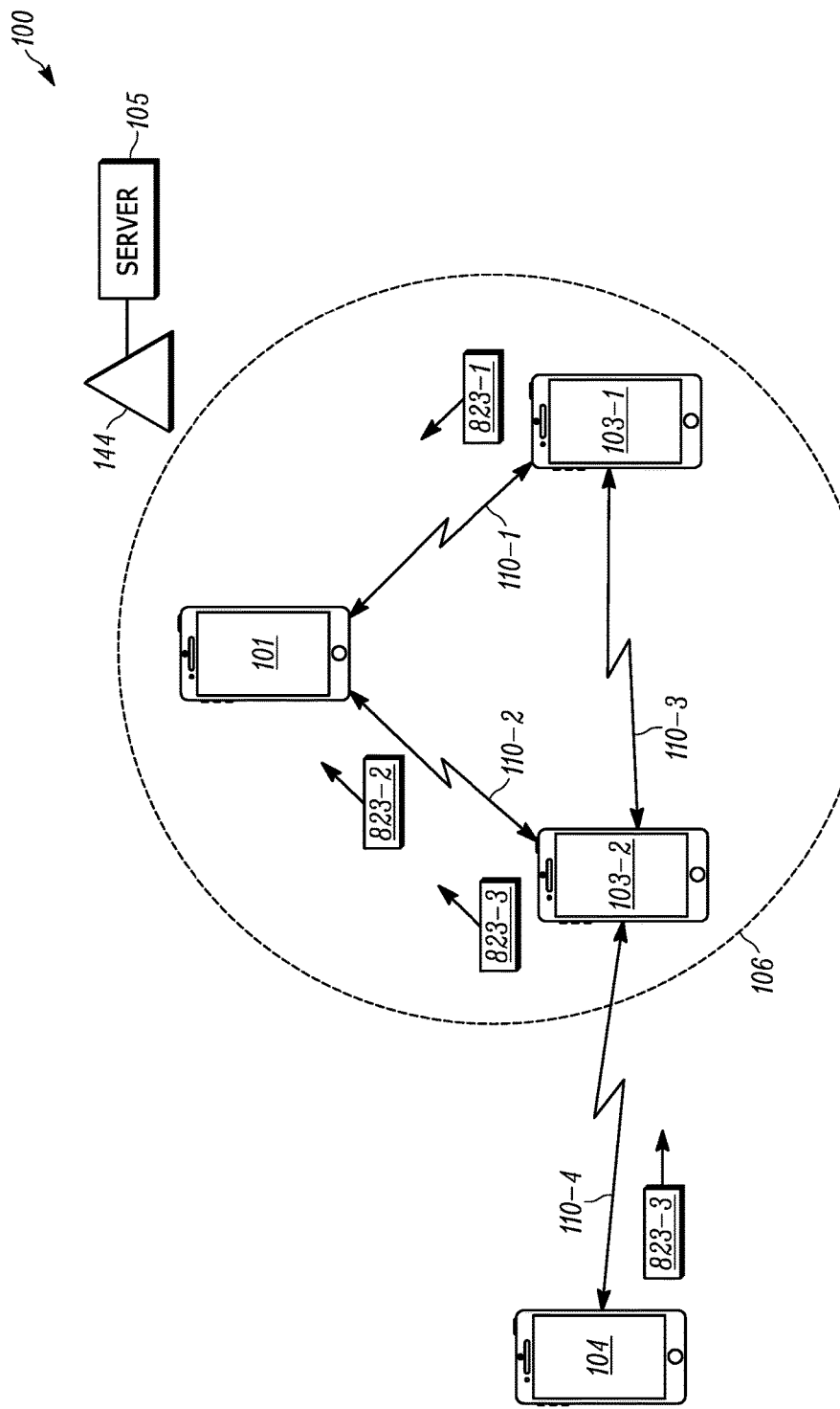
FIG. 8 depicts the devices of the system of FIG. 1 communicating data of in-use sounds using a P2P network, according to non-limiting implementations.

Attention is next directed to FIG. 8, which is substantially similar to FIG. 1, with like elements having like numbers. In FIG. 8, device 101 communicates, using interface 224, with other devices 103, 104 to determine sounds currently in use by other devices 103, 104. In particular, device 101 receives respective data 823-1, 823-2, 823-3 from each of devices 103, 104 comprising identifiers of which sounds are in use at each of devices 103, 104. Hence, FIG. 8 may represent an implementation of block 701 of method 700

For example, device 103-1 transmits, via link 110-1, data 823-1 to device 101, data 823-1 indicating one or more sounds in use at device 103-1; for example, data 823-1 may comprise one or more identifiers of sounds and/or sets of data 223 in use at device 103-1. Similarly, device 103-2 transmits, via link 110-2, data 823-2 to device 101, data 823-2 indicating one or more sounds in use at device 103-2; for example, data 823-2 may comprise one or more identifiers of sounds and/or sets of data 223 in use at device 103-2. Furthermore, device 104 transmits, via link 110-3, data 823-3 to device 103-2, which in turn transmits data 823-3 to device 101 via link 110-2, data 823-3 indicating one or more sounds in use at device 104; for example, data 823-3 may comprise one or more identifiers of sounds and/or sets of data 223 which in use at device 104.

Data 823-1, 823-2, 823-3 will be interchangeably referred to hereafter, collectively, as data 823 and, generically, as data 823 and/or a set of data 823.

In some implementations, data 823 indicates which sounds are in-use in system 100, independent of devices 103, 104 using the sounds; while, in other implementations, data 823 indicates which sounds are in-use in system 100, as well as identifiers of devices 103, 104 using the sounds.

In general, each set of data 823 may be generated from respective indicators 323, 423 at devices 103, 104. Furthermore, data 823 may optionally include a location of a respective device 103, 104. Alternatively, each device 101, 103, 104 may periodically transmit a respective location to other devices 101, 103, 104 in the P2P network.

In some implementations data 823 is transmitted to device 101 upon request from device 101 (e.g. device 101 transmit a request on the P2P network for sounds in use by other devices 103, 104, and devices 103, 104 responsively transmit respective data 823 to device 101). In other implementations data 823 is transmitted to device 101 when device 101 registers with the P2P network (e.g. device 101 transmits a handshake request on the P2P network to any devices 103, 104 within a broadcast range of device 101, and other devices 103, 104, responsively transmit respective data 823 to device 101).

Figure 9:
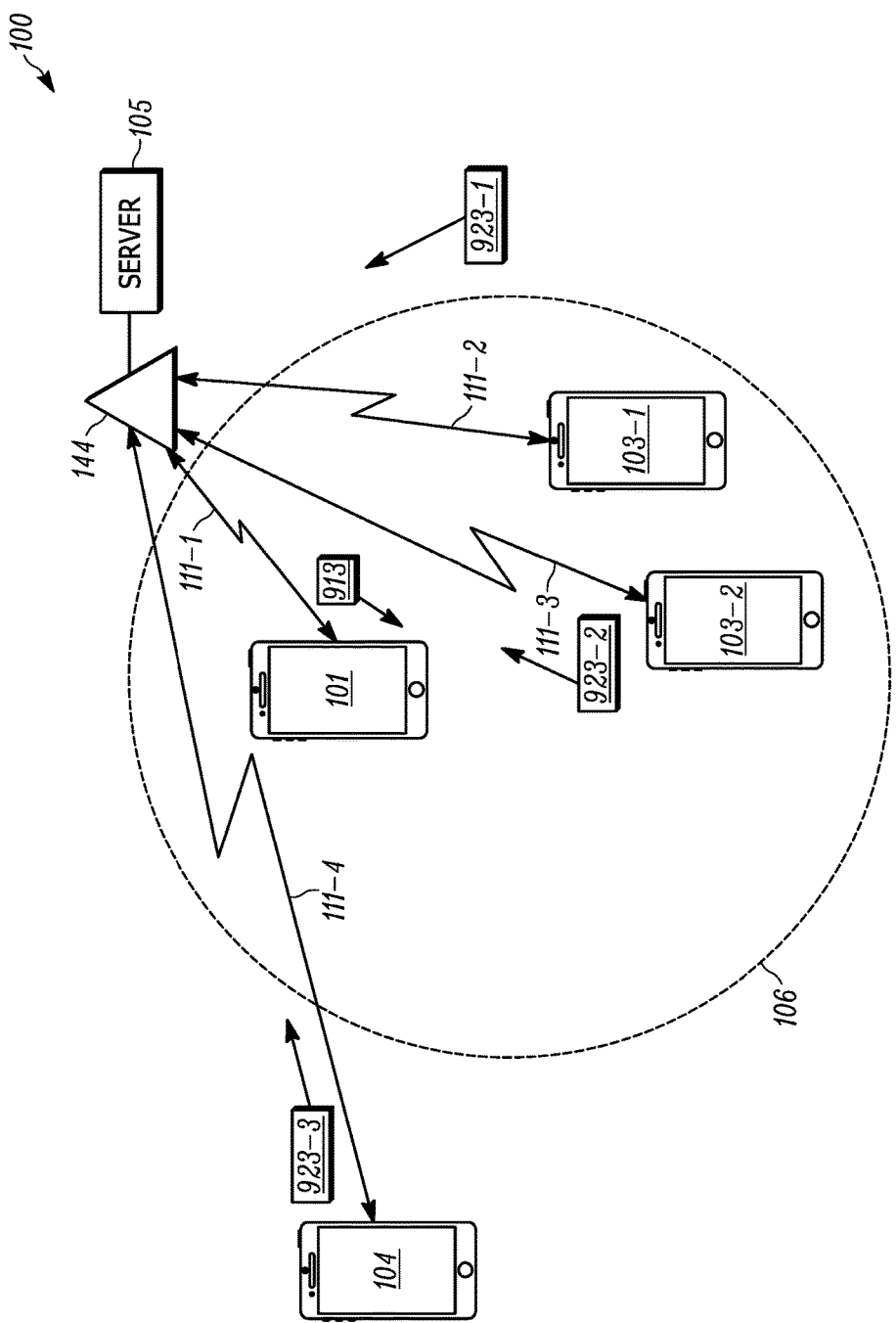
FIG. 9 depicts the devices of the system of FIG. 1 communicating data of in-use sounds using the server, according to non-limiting implementations.

Alternatively, identifiers of sounds in use by other devices 103, 104 may be received from server 105 (e.g. using access point 144 or another communication network). For example, attention is next directed to FIG. 9, which is substantially similar to FIG. 2, with like elements having like numbers. In FIG. 9, device 101 communicates, using interface 224, with server 105 to determine sounds currently in use by other devices 103, 104. In particular, device 101 receives respective, via link 111-1, data 913 from server 105 comprising identifiers of which sounds are in use at each of devices 103, 104. Hence, FIG. 9 may represent an alternative implementation of block 701 of method 700.

For example, in some implementations, device 103-1 transmits, via link 111-2, data 923-1 to server 105, data 923-1 indicating one or more sounds in use at device 103-1; for example, data 923-1 may be similar to data 823-1. Similarly, device 103-2 transmits, via link 111-3, data 923-2 to server 105, data 923-2 indicating one or more sounds in use at device 103-2; for example, data 923-2 may be similar to data 823-2. Furthermore, device 104 transmits, via link 111-4, data 923-3 to server 105, data 923-3 indicating one or more sounds in use at device 104; for example, data 923-3 may be similar to data 823-3. Data 923-1, 923-2, 923-3 will be interchangeably referred to hereafter, collectively, as data 923 and, generically, as data 923 and/or a set of data 923. Such data 923 may be used to populate the indicators associated with data 223 at server 105, depicted in FIG. 6.

In general, each set of data 923 may be generated from respective indicators 323, 423 at devices 103, 104. Furthermore, data 923 may optionally include a location of a respective device 103, 104. Alternatively, each device 101, 103, 104 may periodically transmit a respective location to server 105.

Server 105 transmits data 913 to device 101, data 913 comprising data 923 and/or at least a portion of data 923 and/or data that indicates which sounds are in use at devices 103, 104. In some implementations, data 913 indicates which sounds are in-use in system 100, independent of devices 103, 104 using the sounds; while, in other implementations, data 913 indicates which sounds are in-use in system 100, as well as identifiers of devices 103, 104 using the sounds.

In some implementations data 923 is transmitted to server 105 upon request from server 105. In other implementations data 923 is transmitted to server 105 when each device 103, 104 registers with server 105. In yet further implementations server 105 may assign sounds to each device 103, 104 for use, such that transmission of data 923 by devices 103, 104 does not occur (e.g. as server 105 assigns sounds, server 105 may have an existing record of which sounds are in use by devices 103, 104).

Similarly, in some implementations data 913 is transmitted to device 101 upon request. In other implementations data 913 is transmitted to device 101 when device 101 registers with server 105.

Figure 10:
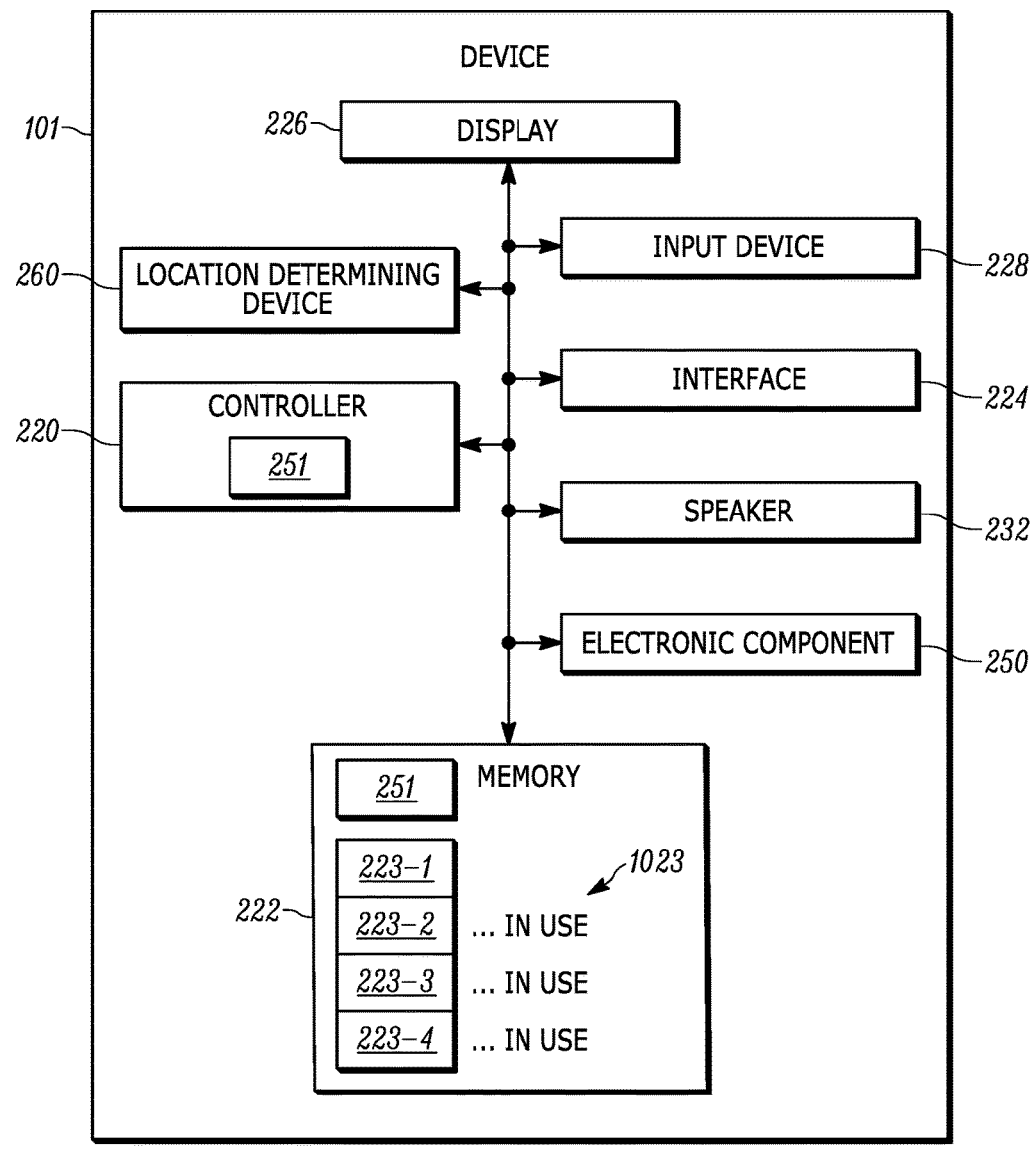
FIG. 10 depicts the device of FIG. 3 with indicators of which sounds are in use at other devices in the system of FIG. 1, according to non-limiting implementations.

Attention is next directed to FIG. 10, which is substantially similar to FIG. 3, with like elements having like numbers. However, in FIG. 10, controller 220 is executing application 251, and it is assumed that block 701 of method 700 has occurred, for example by way of one or more implementations depicted in FIG. 8 and FIG. 9 (e.g. device 101 may determine which sounds are in use by a combination of communication with devices 103, 104 and server 105). Hence, controller 220 has received one or more of data 823 and data 913.

In particular, as depicted in FIG. 10, controller 220 has determined that sounds defined by each of data 223-2, 223-3, 223-4 are in use (e.g. by devices 103, 104 based on one or more of data 823 and data 913). For example, a sound defined by data 223-2 may be in use by device 103-1, a sound defined by data 223-3 may be in use by device 103-1, and a sound defined by data 223-4 may be in use by device 104. As such, in depicted implementations, controller 220 may, at least temporarily, store an indicator 1023 in association with each of data 223-2, 223-3, 223-4 that sounds associated with each of data 223-2, 223-3, 223-4 are in use by other devices. As depicted, such indicators 1023 may comprise the alphanumeric text "IN USE", however, in other implementations such an indicator may comprise any alphanumeric data and/or flag and the like that indicates an in-use state of respective data 223. In yet further implementations, each indicator 1023 may further comprise one or more of: an identifier of one or more devices 103, 104 where sounds associated with respective data 223 are in-use, a location of one or more devices 103, 104, identifiers of given actions associated with the sounds (similar to indicators 523) and the like.

In yet further implementations indicators 1023 of sounds in use by other devices 103, 104 are not stored in memory 222; rather data 823, 913 may be used to implement method 700 without otherwise determining and/or storing indicators 1023.

Figure 11:
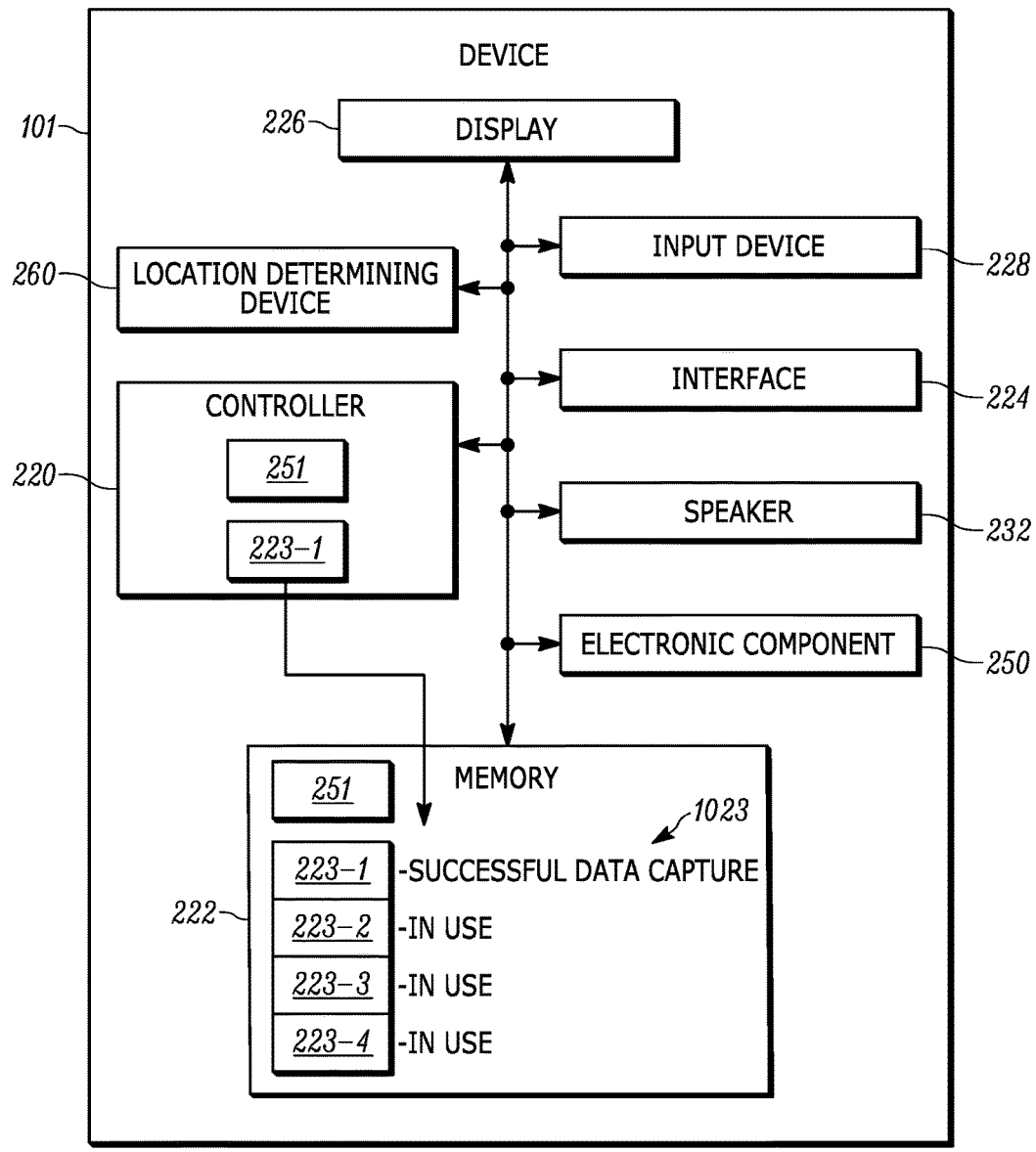
FIG. 11 depicts the device of FIG. 3 after a sound as been selected for sound interference avoidance, according to non-limiting implementations.

With reference to FIG. 11 (which is substantially similar to FIG. 10, with like elements having like numbers), controller 220 (e.g. at block 703 of method 700) selects one sound, of the plurality of different sounds (e.g. as defined by data 223), to indicate a given action of electronic component 250, based on the sounds in use by other devices 103, 104. In particular, a sound defined by data 223-1 is selected that is different from the sounds in use by other devices 103, 104; for example, the sound defined by data 223-1 is selected to indicate a successful data capture by electronic component 250 (assuming electronic component 250 includes a data capture device), which will be different from sounds defined by data 223-2, 223-3, 223-4 that are in use at devices 103, 104 (e.g. to also indicate a successful data capture and/or another given action).

Figure 12:
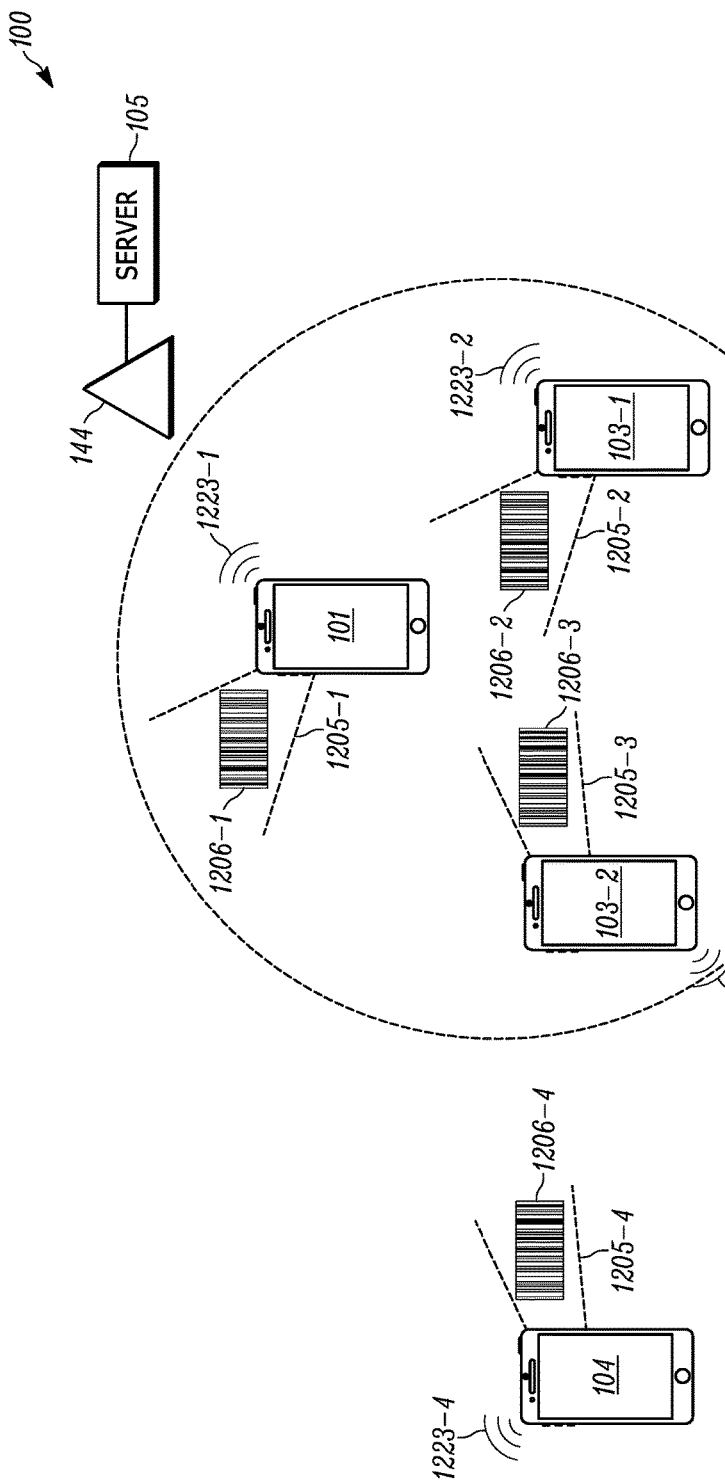
FIG. 12 depicts the system of FIG. 1 after a sound as been selected at the device of FIG. 3 for sound interference avoidance, according to non-limiting implementations.

Attention is next directed to FIG. 12 which depicts an implementation of block 705 of method 700. FIG. 12 is substantially similar to FIG. 1 with like elements having like numbers, though links 110 are not depicted for clarity. In particular, in FIG. 12, each of devices 101, 103, 104 are performing a respective successful data capture (e.g. a given action) 1205-1, 1205-2, 1205-3, 1205-4, using a respective data capture device (e.g. a respective electronic component 250, 350, 450, not depicted in FIG. 12, but nonetheless assumed to be present) of a respective barcode 1206-1, 1206-2, 1206-3, 1206-4. While not all components of devices 101, 103, 104 are depicted in FIG. 12, they are assumed to be nonetheless present.

As also depicted in FIG. 12, when device 101 (e.g. using controller 220) detects the action (e.g. at electronic component 250), controller 220 controls speaker 232 to play one sound 1223-1 that has been selected based on sounds in use by other devices 103, 104, sound 1223-1 corresponding to data 223-1, as selected in FIG. 11.

Furthermore, each of devices 103-1, 103-2, 104 are depicted as controlling a respective speaker 332, 432 to play respective sounds 1223-2, 1223-3, 1223-4 corresponding, respectively to data 223-2, 223-3, 223-4, to indicate a respective successful data capture.

As described above, data 223-1 used to generate sound 1223-1 is different from data 223-2, 223-3, 223-4; hence sound 1223-1 is different from sounds 1223-2, 1223-3, 1223-4.

Furthermore, as sound 1223-1 is different from at least sounds 1223-2, 1223-3, when a worker using device 101 hears sounds 1223-2, 1223-3, the worker will not mistake sounds 1223-2, 1223-3 for a successful data capture at device 101.

Similarly, when device 101 is transported within an audible distance to device 104, and/or in proximity to device 104, and as sound 1223-1 is also different from 1223-4, when a worker using device 101 hears sound 1223-4, the worker will not mistake sound 1223-4 for a successful data capture at device 101.

As described heretofore, it has generally been assumed that each of data 223 may be used to produce sounds to indicate a similar given action at each of devices 101, 103, 104, for example, a successful data capture at a data capture device. However, other implementations are within the scope of the present specification. For example, data 223 at one or more of devices 101, 103, 104 may be used to indicate one or more other different given actions, including, but not limited to, an unsuccessful data capture, and/or a telephone call and/or receipt of a message, and the like. Hence, selection of a sound using method 700 may occur according to whether or not a sound is in use at other devices, independent of an associated given action; however, in some specific implementations, each set of data 223 may be used to produce sounds for a same given action.

Furthermore, heretofore it has been assumed that a sound defined by at least one set of data 223 is not in use at system 100 prior to execution of method 700 at device 101. However, in some implementations, sounds defined by all of data 223 may be in use at system 100 prior to execution of method 700 at device 101. For example, at each of devices 103, sounds associated with each set of data 223-2, 223-3, 223-4 may be in use (e.g. for different given actions, which may be the same or different at each device 103), and at device 104, sounds associated with each set of data 223-1, 223-4, may be in use (e.g. for different given actions). Hence, in system 100: a sound associated with data 223-1 may be in-use at one of devices 103, 104; a sound associated with each set of data 223-2, 223-3 may be in-use at two of devices 103, 104; and a sound associated with each set of data 223-2, 223-3 may be in-use at three of devices 103, 104. Such a count of a number of times a given set of data 223 is in use in system 100 and/or at other devices 103, 104 may be determined at device 101 from data 823, 913.

Figure 13:
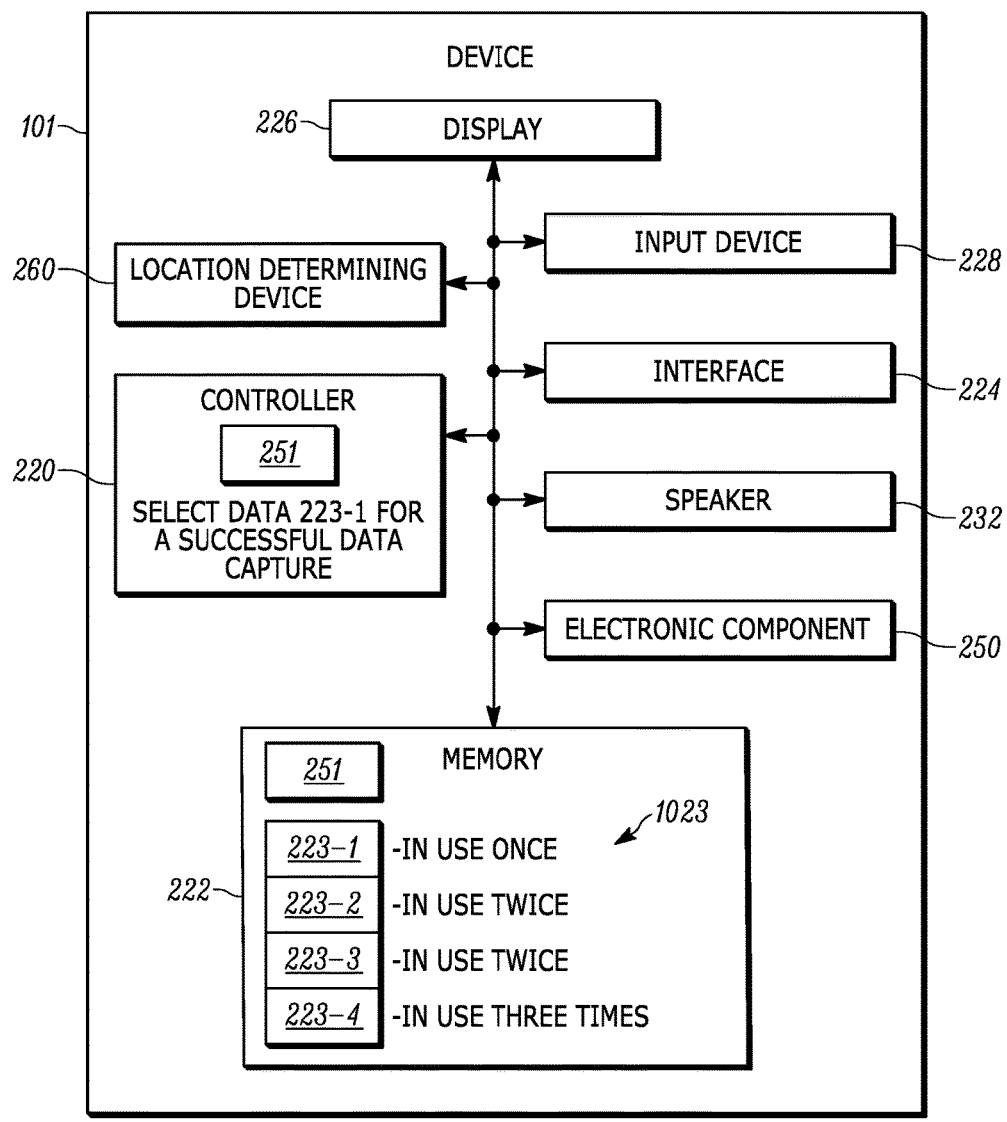
FIG. 13 depicts the device of FIG. 3 with a count of sounds in use at other devices in the system of FIG. 1, according to non-limiting implementations.

Hence, attention is next directed to FIG. 13 (which is substantially similar to FIG. 3, with like elements having like numbers), which depicts device 101 after receipt of one or more data 823, 913, is received, and controller 220 performs a count of each instance of a sound of a given set of data 223 being in use (e.g. using one or more of data 823, 913). Indicators 1023 are adapted to reflect such a count. As such, controller 220 (e.g. at block 703 of method 700) may be configured to: when all of plurality of different sounds (e.g. defined by data 223) stored in memory 222 are in use by other devices 103, 104, select one sound to indicate a given action, of the plurality of different sounds, that is least currently used by other devices 103, 104. As depicted, the sound that is least currently used by other devices 103, 104 is a sound defined by data 223-1, and hence the given action (e.g. a successful data capture) at device 101 is assigned a sound defined by data 223-1 (e.g. as indicated at controller 220 in FIG. 13).

In yet further implementations, indicators 1023 may include a count of a number of uses in system 100 of a sound for the given action of electronic component 250 and the controller 220 (e.g. at block 703 of method 700) may be configured to: when all of plurality of different sounds (e.g. defined by data 223) stored in memory 222 are in use by other devices 103, 104 to indicate the given action, select one sound to indicate the given action, of the plurality of different sounds, that is least currently used by other devices 103, 104 to indicate the given action. In other words, the count is of uses for the given action for which a sound is being selected at device 101. For example, when the given action is a successful data capture, the count of uses of sounds defined by data 223 may be only for uses of such sounds to indicate a successful data capture.

In yet further implementations, selecting of a sound to indicate a given action may be further based on locations of devices 103, 104 and/or locations of devices 101, 103, 104.

Figure 14:
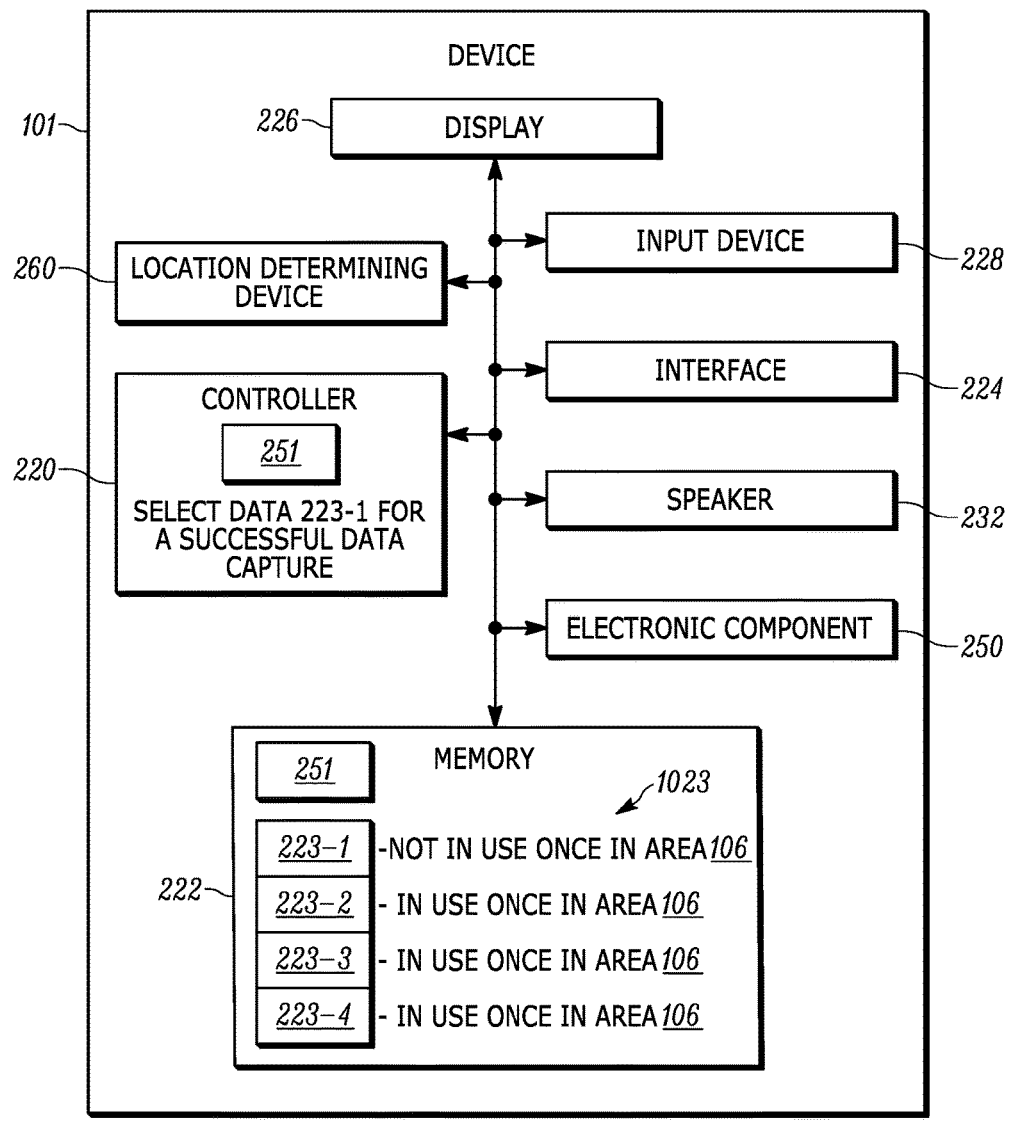
FIG. 14 depicts the device of FIG. 3 with locations of other devices where sounds are in use in the system of FIG. 1, according to non-limiting implementations.

For example, attention is next directed to FIG. 14 (which is substantially similar to FIG. 3, with like elements having like numbers), which depicts device 101 after receipt of one or more of data 823, 913, is received, and assuming that data 823, 913 includes respective locations of devices 103, 104. Controller 220 may hence determine a location of devices 103, 104 from data 823, 913 and/or by requesting locations of devices 103, 104 from one or more of devices 103, 104 and server 105.

As depicted, controller 220 has adapted indicators 1023 to indicate locations of devices 103, 104. In some implementations, such indicators 1023 may include absolute indicators of location (including, but not limited to, GPS coordinates); however, as depicted, indicators 1023 merely indicate whether a sound associated with each set of data 223 is in-use inside area 106 or outside area 106. Such a determination of relative location may be determined from absolute location data of devices 103, 104, received in data 823, 913 (or from locations received in other data from devices 103, 104 and/or server 105); for example, device 101 and/or server 105 may be configured with absolute location coordinates of area 106 and the locations of devices 103, 104 may be compared thereto. In some implementations, absolute locations may be defined with respect to an origin located in a physical space of system 100 (such as a warehouse and the like).

Sounds defined by each of data 223-2, 223-3, 223-4 may be in use by devices 103 (located in area 106, with reference to FIG. 1), and a sound defined by data 223-1 may be in use at device 104 (located outside area 106, with reference to FIG. 1).

Furthermore, controller 220 may determine, using location determining device 260, that device 101 is located in area 106 and responsively select a sound to indicate a given action based on sounds that are not in use in area 106, for example a sound defined by data 223-1.

Alternatively, device 101 may store a location on where device 101 is to be used by worker (e.g. location data defining area 106), and/or device 101 may request a location on where device 101 is to be used from server 105, and select a sound accordingly.

For example, when device 101 is initially turned on and/or device 101 is logged into, device 101 may be located in a storage area and/or a charging area where device 101 may be both not in use and not in a location where device 101 is to be used. Assuming method 700 is being implemented at device 101 outside of area 106, but device 101 is to be transported to area 106, device 101 may determine a location where it is to be used, and select a sound for a given action accordingly.

Similarly, rather than a sound being selected for a given action based on a current location of each of devices 103, 104, a sound may be selected based on predetermined in-use locations of devices 103, 104. In other words, each of devices 103, 104 may be associated with a given location (such as inside or outside area 106) even if devices 103, 104 are not currently located in the associated given location. As such, a sound being selected for a given action at device 101 may be selected based on the predetermined in-use locations of devices 103, 104. For example, devices 101, 103, 104 may be assigned to different areas of a warehouse (e.g. by server 105) and a sound for a given action at device 101 may be selected accordingly.

Hence, controller 220 may be further configured to (e.g. at block 703 of method 700): when all of the plurality of different sounds stored in memory 222 (e.g. as defined by data 223) are in use by other devices 103, 104, select a one sound for a given action, of the plurality of different sounds, based on one or more locations of other devices 103, 104. Such locations may include current locations, assigned and/or intended in-use locations, and the like.

Controller 220 may be yet further configured to (e.g. at block 703 of method 700): select a one sound for a given action, of the plurality of different sounds, based on one or more locations of other devices 103, 104. In other words, a selection of a sound for a given action may be based on based on one or more locations of other devices 103, 104 whether or not all of the plurality of different sounds stored in memory 222 (e.g. as defined by data 223) are in use by other devices 103, 104.

In yet further implementations controller 220 may be configured to: select a one sound for a given action, of the plurality of different sounds, based on a grouping of other devices 103, 104. Such a grouping may be performed by server 105 and is similar to each of devices 103, 104 being assigned to a respective predetermined location. For example, rather than devices 101, 103 being specifically assigned to area 106, devices 101, 103 may be assigned to a same group of devices that are intended to work in proximity to one another and/or in a similar location and/or for a similar use, without specifically determining a location where devices 101, 103 are to be used. Similarly, device 104 may be assigned to a different group.

In yet further implementations, controller 220 may be further configured to: control speaker 232 to play the one sound that has been selected to indicate a given action only for a given time period after the one sound being selected. For example, such a time period may be based on one or more of: a length of time of a shift in system 100 (e.g. a worker's shift in a warehouse), a timer period that begins when device 101 is removed from a charging cradle and the like, a timer, a clock time, device 101 being logged into and/or logged out of (and/or an application of device 101 being logged into and/or logged out of) and/or an ending of assigned activity.

Figure 15:
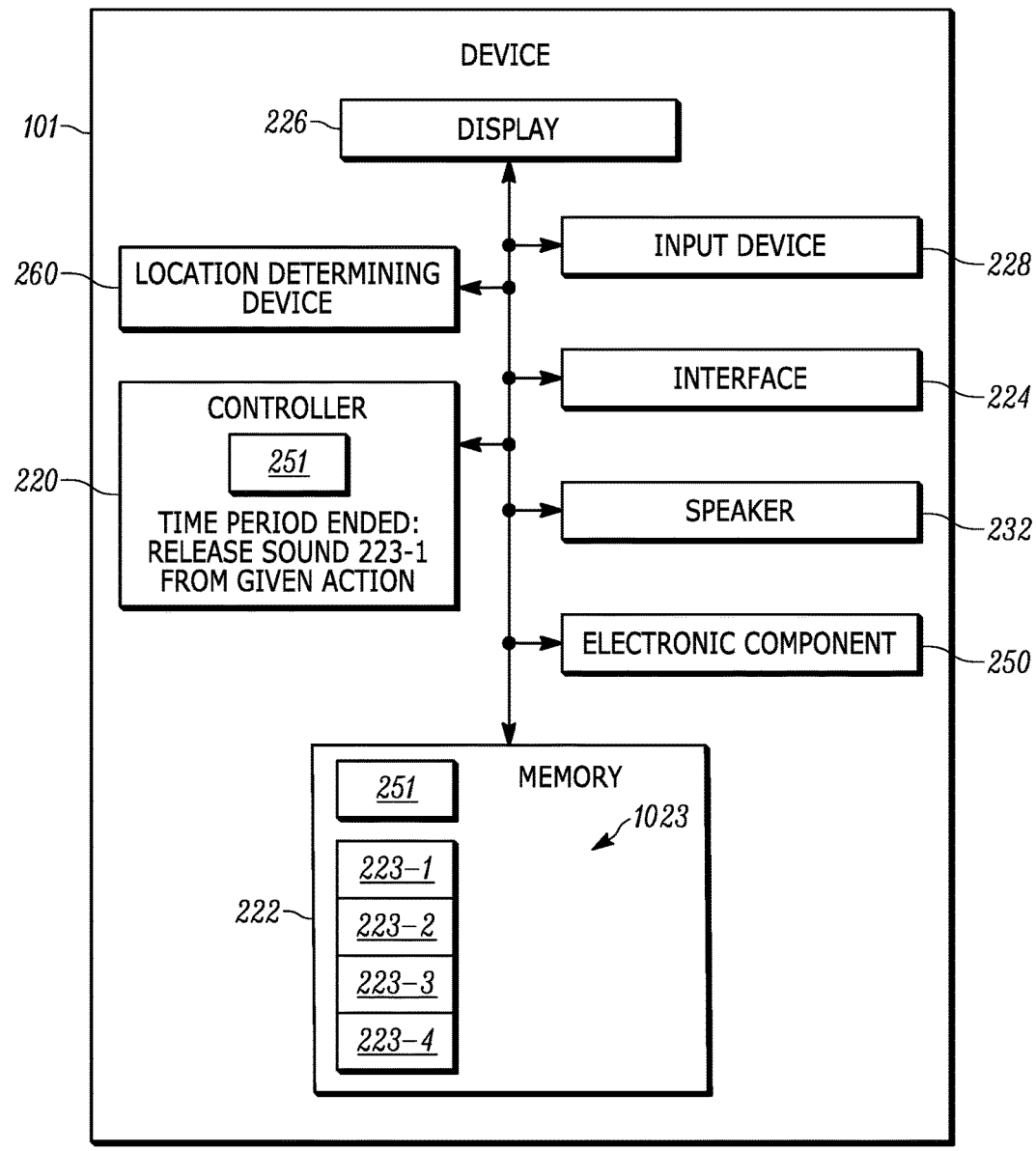
FIG. 15 depicts the device of FIG. 3 after a selected sound is released, according to non-limiting implementations.

For example, attention is directed to FIG. 15 (which is substantially similar to FIG. 3, with like elements having like numbers) which depicts device 101 after a time period has ended; specifically, controller 220 deselects and/or releases sound defined by data 223-1 from association with a given action. Furthermore, all indicators 1023 of data 223 may be cleared and/or deleted.

In other words, controller 220 may be further configured to one or more of: control speaker 232 to play the one sound that has been selected only for a given time period after the one sound being selected; unselect the one sound after an in-use period is over; and unselect the one sound when a given event is detected (including, but not limited to, insertion of device 101 into a cradle and/or a charging cradle, a log-out occurring at device 101, and the like).

Furthermore, while method 700 may be implemented on an on-going basis, and/or periodically, at device 101 such that a sound for the given action may be updated based on changes in use of sounds at other devices 103, 104, method 700 may also generally be performed only at the beginning of a given time period, for example a beginning of a shift and/or when device 101 (and/or an application at device 101) is logged into and/or when device 101 is removed from a charging cradle, and the like. In other words, during a shift and/or a given use-period, the sound selected at block 703 of method 700 does not change so that the sound for indicating a given action is consistent through the use-period.

Figure 16:
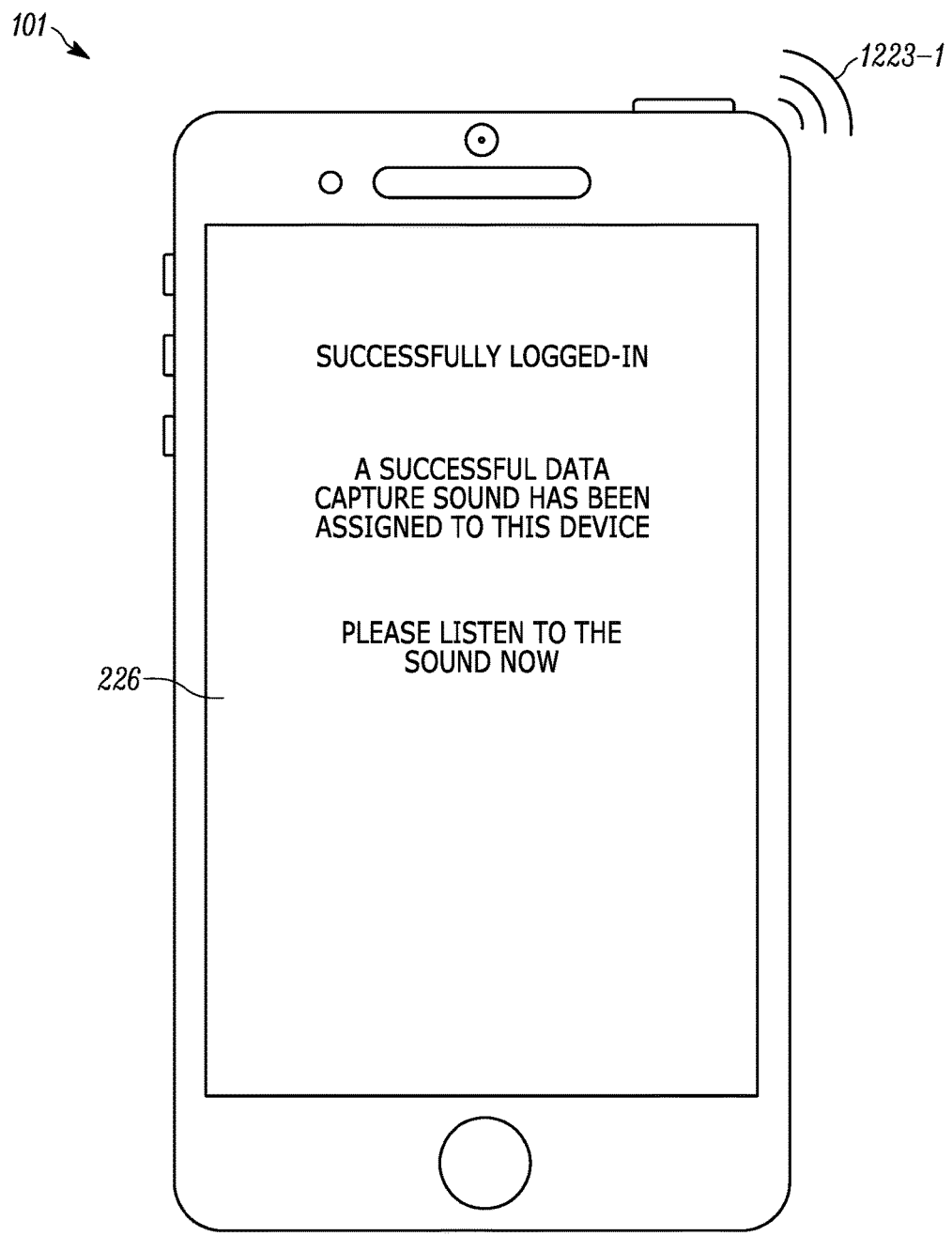
FIG. 16 depicts a front perspective view of the device of FIG. 3 at the beginning of an in-use period and after a sound has been selected for sound interference avoidance, according to non-limiting implementations.

For example, attention is directed to FIG. 16 which a perspective view of device 101 and in particular display 226 of device 101 at the beginning of a given time period and/or a given use-period, for example when device 101 (and/or an application at device 101) is logged into, and after at least block 703 of method 700 has been implemented. In particular, controller 220 may render a GUI (such as text, and the like) indicating a successful log-in, and furthermore the GUI may include an indication that the selected sound for a given action (such as a successful data capture) has been selected. Furthermore, as also depicted in FIG. 16, the selected sound may be played by speaker 232; for example, in FIG. 16, sound 1223-1 is emitted and/or played to familiarize a worker using device 101 with sound 1223-1 used to indicate a successful data capture.

Heretofore, implementations have been described in which method 700 is implemented at device 101. However, method 700 could also be implemented at one or more of devices 103, 104, similar to as described herein with respect to device 101. In addition, at least a portion of method 700 can be implemented at server 105 such that server 105 determines which sounds are in use in system 100 and assigns sounds to devices 101, 103, 104 based on which sounds are in use in system 100; for example, server 105 can implement at least a portion of blocks 701, 703 of method 700, and communicate with one or more devices 101, 103, 104 to assign sounds for given actions of respective electronic components 250, 350, 450 that avoids and/or reduces sound interference in system 100.

Hence, provided herein is a device at which sounds are selected to avoid interference with sounds at other devices by determining sounds in use at other devices and selecting a sound to indicate a given action based on the sounds in use at the other devices.

In the foregoing specification, specific implementations have been described. However, one of ordinary skill in the art appreciates that various modifications and changes may be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, XZ, YZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

We claim:

1. A device comprising:
    a speaker;
    an electronic component;
    a memory storing data defining a plurality of different sounds associated with a given action at the electronic component;
    a communication interface; and,
    a controller configured to:
        communicate, using the communication interface, with one or more of a server and other devices to determine sounds currently in use by the other devices;
        select one sound, of the plurality of different sounds, to indicate the given action based on the sounds in use by the other devices;
        when the given action is detected at the electronic component, control the speaker to play the one sound that has been selected; and
        when all of the plurality of different sounds stored in the memory are in use by the other devices, select the one sound, of the plurality of different sounds that is least currently used by the other devices.

2. The device of claim 1, wherein the controller is further configured to: select the one sound, of the plurality of different sounds, different from the sounds in use by the other devices.

3. The device of claim 1, wherein the controller is further configured to: when all of the plurality of different sounds stored in the memory are in use by the other devices, select the one sound, of the plurality of different sounds based on one or more of locations of the other devices.

4. The device of claim 1, wherein the controller is further configured to one or more of: control the speaker to play the one sound that has been selected only for a given time period after the one sound being selected; unselect the one sound after an in-use period is over; and unselect the one sound when a given event is detected.

5. The device of claim 1, wherein the electronic component comprises a data capture component, and the given action comprises a successful data capture.

6. The device of claim 1, wherein the electronic component comprises a data capture component, and the given action comprises an unsuccessful data capture.

7. The device of claim 1, wherein the electronic component comprises one or more of a radio component, a push-to-talk component, and a telephonic component, the given action comprises a communication action.

8. The device of claim 1, wherein the electronic component comprises a messaging component, and the given action comprises a messaging action.

9. The device of claim 1, further comprising a mobile device.

10. A method comprising:
    at a device including: a speaker; an electronic component; a memory storing data defining a plurality of different sounds associated with a given action at the electronic component; a communication interface; and, a controller, communicating, using the communication interface, with one or more of a server and other devices to determine sounds currently in use by the other devices:
    selecting, using the controller, one sound, of the plurality of different sounds, to indicate the given action based on the sounds in use by the other devices;
    when the given action is detected at the electronic component, controlling, using the controller, the speaker to play the one sound that has been selected;
    when all of the plurality of different sounds stored in the memory are in use by the other devices, selecting the one sound, of the plurality of different sounds that is least currently used by the other devices.

11. The method of claim 10, further comprising: selecting the one sound, of the plurality of different sounds, different from the sounds in use by the other devices.

12. The method of claim 10, further comprising: when all of the plurality of different sounds stored in the memory are in use by the other devices, selecting the one sound, of the plurality of different sounds based on one or more of locations of the other devices.

13. The method of claim 10, further comprising one or more of: controlling the speaker to play the one sound that has been selected only for a given time period after the one sound being selected; unselecting the one sound after an in-use period is over; and unselecting the one sound when a given event is detected.

14. The method of claim 10, wherein the electronic component comprises a data capture component, and the given action comprises a successful data capture.

15. The method of claim 10, wherein the electronic component comprises a data capture component, and the given action comprises an unsuccessful data capture.

16. The method of claim 10, wherein the electronic component comprises one or more of a radio component, a push-to-talk component, and a telephonic component, the given action comprises a communication action.

17. The method of claim 10, wherein the electronic component comprises a messaging component, and the given action comprises a messaging action.

18. A non-transitory computer-readable medium storing computer executable instructions, the instructions comprising:

at a device including: a speaker; an electronic component; a memory storing data defining a plurality of different sounds associated with a given action at the electronic component; a communication interface; and, a controller, communicating, using the communication interface, with one or more of a server and other mobile devices to determine sounds currently in use by the other mobile devices:

selecting, using the controller, one sound, of the plurality of different sounds, to indicate the given action based on the sounds in use by the other mobile devices;

when the given action is detected at the electronic component, controlling, using the controller, the speaker to play the one sound that has been selected: and one or more of: controlling the speaker to play the one sound that has been selected only for a given time period after the one sound being selected, unselecting the one sound after an in-use period is over, and unselecting the one sound when a given event is detected.

\* \* \* \* \*